United States Patent [19]
Mokratschek et al.

[11] 4,080,116
[45] Mar. 21, 1978

[54] SEAL GRID FOR A ROTARY INTERNAL COMBUSTION ENGINE

[75] Inventors: Anton Mokratschek, Zuttlingen; Max Ruf, Obereisesheim; Horst Ehemann, Bad Friedrichshall, all of Germany

[73] Assignee: Audi NSU Auto Union Aktiengesellschaft, Neckarsulm, Germany

[21] Appl. No.: 587,608

[22] Filed: Jun. 17, 1975

[30] Foreign Application Priority Data

Jun. 19, 1974 Germany .............................. 2429386

[51] Int. Cl.² .............................................. F01C 19/12
[52] U.S. Cl. ...................................... 418/75; 418/142
[58] Field of Search ................... 418/61 A, 75, 79, 80, 418/81, 142

[56] References Cited
U.S. PATENT DOCUMENTS

| 2,979,042 | 4/1961 | Bentele | 418/142 X |
| 3,396,708 | 8/1968 | Tado | 418/142 X |
| 3,540,815 | 11/1970 | Belzner et al. | 418/142 X |
| 3,834,845 | 9/1974 | Siler | 418/142 |

FOREIGN PATENT DOCUMENTS

| 1,175,505 | 8/1964 | Germany | 418/142 |

*Primary Examiner*—Carlton R. Croyle
*Assistant Examiner*—Leonard Smith
*Attorney, Agent, or Firm*—Arthur Frederick; Victor D. Behn

[57] ABSTRACT

The improved sealing grid for a rotary internal combustion engine of the Wankel type comprises a transfer passage means intermittently communicating the space between the inner and outer seals with the working chamber in the exhaust phase, to pass spent combustion gas from the latter to said space and thereby intermittently pressurize the space behind the inner seal and thereby urge the latter into sealing contact with the adjacent wall.

4 Claims, 5 Drawing Figures

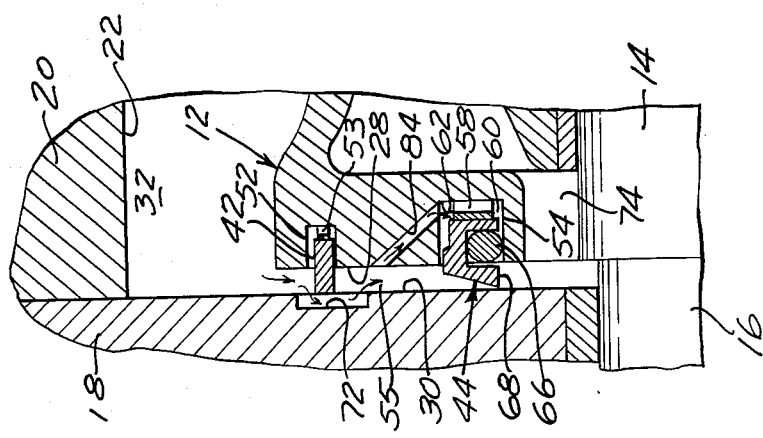
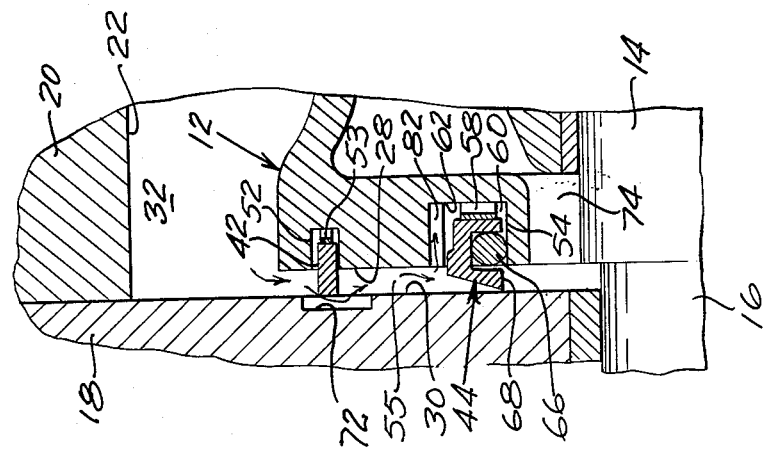

SEAL GRID FOR A ROTARY INTERNAL COMBUSTION ENGINE

This invention relates to rotary internal combustion engines of the Wankel type and, more specifically, to an improved sealing grid for such engines.

BACKGROUND OF THE INVENTION

In rotary internal combustion engines of the type disclosed in the U.S. Patent to Wankel et al, U.S. Pat. No. 2,988,065, dated June 13, 1961, in which a multi-cornered rotor is eccentrically supported within a multi-lobed housing cavity defined by end walls and an intermediate wall having an inner trochoidal shaped surface, a sealing grid is provided to isolate each of the working chambers defined by the rotor and housing from each other and thereby achieve optimum volumetric efficiency and hence engine efficiency. The sealing grid as exemplified in the U.S. Patents to Bentele, U.S. Pat. No. 2,979,042 dated Apr. 11, 1961; Bentele, U.S. Pat. No. 3,033,180 dated May 8, 1962; Bentele, U.S. Pat. No. 3,112,870 dated Dec. 3, 1963; Jones et al, U.S. Pat. No. 3,180,563 dated Apr. 27, 1965; and Jones U.S. Pat. No. 3,400,939 dated Sep. 10, 1968, usually comprises apex seal assemblies, including apex seal pins, at each of the corners of the rotor and in each end face of the rotor, an outer seal consisting of a plurality of gas seal strips and an inner seal or oil seal ring.

It has been found that the effectiveness of the inner seal or oil seal ring is improved when subjected to gas pressure in the space behind the oil seal ring. To provide this gas pressure by increasing the clearance between each of the seal pins of the apex seal assemblies and the gas seal strips so as to effect gas leakage from the working chambers into the space defined between the gas seal strips (outer seal) and the oil seal ring (inner seal) and hence passage of the gas to the space radially inward of the oil seal ring via the space behind the oil seal ring, is not a satisfactory method of providing gas pressure behind the oil seal ring. Such method, as is suggested in the U.S. Patent to Bentele, U.S. Pat. No. 2,979,042, is unsatisfactory because it reduces the volumetric efficiency of the engine and the mean effective pressure in low-speed range and therefore results in increased fuel consumption and a lowering of engine operating efficiency.

It is therefore an object of this invention to provide, in a rotary internal combustion engine, an improved sealing grid in which the inner seals are subjected from behind to gas pressure without impairment of the operating efficiency of the engine.

Another object of the present invention is to provide, in a rotary internal combustion engine, an improved sealing grid in which gas leakage from the working chambers is controlled to intermittently effect pressurization of the space behind each of the inner seals.

A still further object of this invention is to provide in a rotary internal combustion engine, an improved sealing grid in which the mechanical biasing forces on the inner seals is supplemented by fluid pressure and wherein the possibility of sticking of the inner seal is minimized.

SUMMARY OF INVENTION

Accordingly, the present invention contemplates, in a rotary internal combustion engine of the Wankel type, an improved sealing grid in which an inner seal is provided with increased sealing effectiveness.

The engine comprises a housing having an inner peripheral wall of trochoidal shape and end walls defining a cavity therebetween and a multi-cornered rotor, having end faces, eccentrically supported on a drive shaft for planetary rotation within the cavity and defining with the housing walls a plurality of working chambers which successively expand and contract in volumetric size as the rotor rotates.

The sealing grid for isolating the working chambers from each other comprises apex seal assemblies at each of the corners or apices of the rotor and, in each rotor end face, an outer seal and an inner seal spaced radially inwardly of the outer seal, the outer seal and inner seal each being biased to engage an adjacent wall surface to seal the interstices between the housing end wall and end face of the rotor. The outer seal may consist of a plurality of side seal strips which primarily function to prevent escape of gas from the working chambers while the inner seal may comprise an oil seal ring which functions primarily to prevent passage of oil, from the area located radially inward of the oil seal ring, into the working chambers via the space between the inner and outer seals.

The improvement in the sealing grid is the provision of a bypass means which may be in the form of a transfer recess in at least one of the housing end wall surfaces, which transfer recess is located outside of the enveloping curve or trace of the inner seal but within the trace or enveloping curve of the outer seal so that the outer seal intermittently slides over the recess. The transfer recess is also preferably located so that when the outer seal straddles the transfer recess, the transfer recess communicates the space encompassed by the outer and inner seals with a working chamber that is in the exhaust cycle or phase of operation. Thus, the recess permits passage of pressurized exhaust gas into the space between the inner and outer seals from whence it can pass behind the inner seal to urge the inner seals outwardly against their associated end walls. Since the pressurizing gas is exhaust gas, pressurization of the inner seals is achieved without adversely affecting engine power and efficiency.

In the case of a rotary internal combustion engine having a side intake port, it is contemplated that the transfer recess be so located that the recess effects communication between the working chamber during the exhaust cycle and the space between the inner and outer seals only when the outer seal is not sliding over or straddling the side intake port. This location of the transfer recess avoids the possibility of exhaust gas becoming comingled with intake fluid and contaminating such fluid.

In a narrower aspect of the invention, passageway means is provided to communicate the space between the inner and outer seals with the space behind the inner seal to facilitate the flow of pressurized gas to the latter mentioned space. The passageway means is desirable where, as in most conventional inner seal constructions, there is no unobstructed flow passages for conducting pressurized gas into the annular groove in which the seal ring is carried. This passageway means is preferably located adjacent the area where each of the outer seals straddles or slides over the associated transfer recess so that pressure behind the associated inner seal and the space between the inner and outer seals rapidly equalizes, thus insuring intermittent application of force on the inner seals directed toward the housing end walls and insuring the mobility of the inner seal.

The passageway means has utility in engines in which gas is supplied to the space between the inner and outer seals by means other than the transfer recess according to this invention.

BRIEF DESCRIPTION OF THE DRAWINGS

The above and other objects and advantages of the present invention will appear more fully hereinafter from a consideration of the detailed description which follows when taken together with the accompanying drawings wherein several embodiments of the invention are illustrated and in which:

FIG. 3 is a fragmentary cross-sectional view taken substantially along line 3—3 of FIG. 1, shown on an enlarged scale;

FIG. 4 is a view similar to FIG. 3 showing an alternative embodiment of this invention; and FIG. 5 is a view similar to FIG. 4 showing a second alternative embodiment of the present invention.

DESCRIPTION OF PREFERRED EMBODIMENTS

Figure 1:
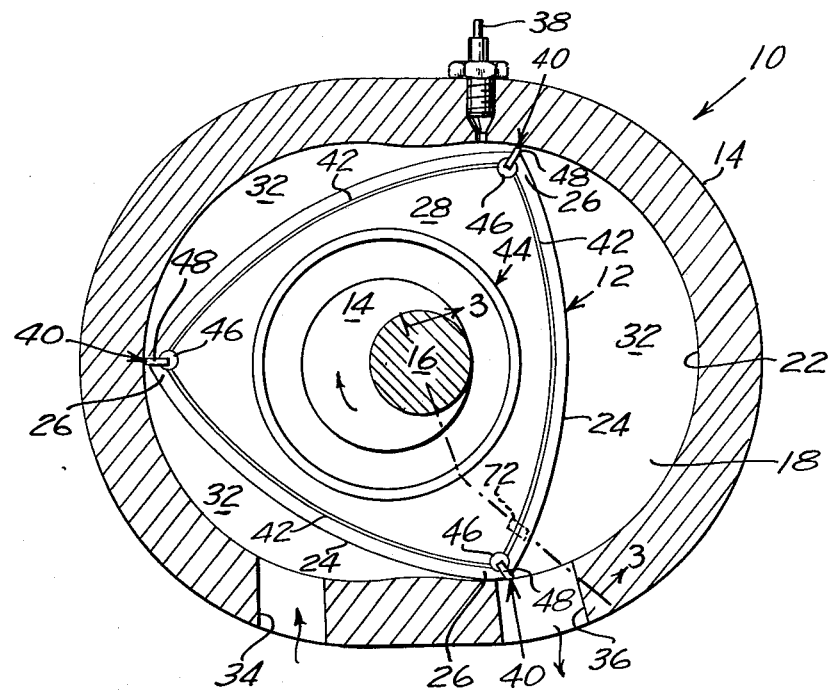
FIG. 1 is a somewhat diagrammatic view, in cross-section, of a rotary internal combustion engine having an improved sealing grid according to this invention.

Now referring to the drawings and more specifically FIG. 1, the reference number 10 generally designates a rotary internal combustion engine of the Wankel type which is provided with the improved sealing grid according to this invention.

Figure 2:
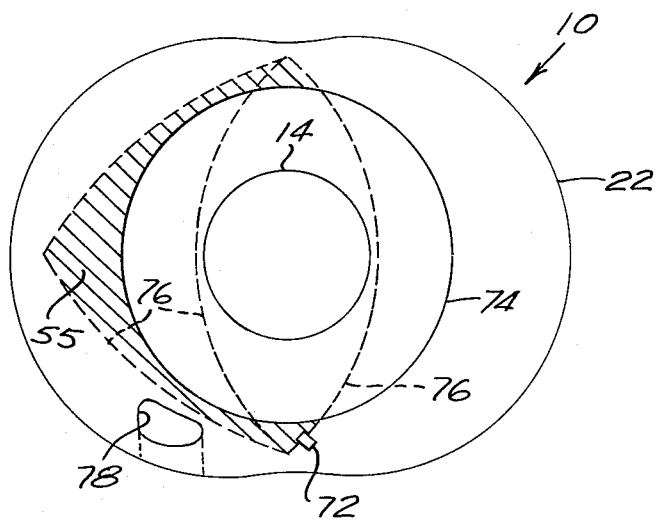
FIG. 2 is a schematic representation of the traces or the enveloping curves of the inner and outer seals of the sealing grid when the engine is provided with a side intake port.

The rotary internal combustion engine 10 comprises a housing within which a rotor 12 is supported for planetary movement on an eccentric portion 14 of a mainshaft 16. The housing consists of two end walls 18 (only one of which is shown) held in spaced relationship to each other by a peripheral wall 20 which has an inner trochoidal shaped surface 22. As shown, the end and peripheral walls 18 and 20 may define a two-lobe cavity while rotor 12 may, as shown, have three peripheral surfaces or flank portions 24 which converge to form apex portions 26 and has opposite end faces 28 (only one of which is illustrated in the drawings) adjacent the inner surfaces 30 of end walls 18 (see FIG. 3). The rotor 12 defines with the housing walls 18 and 20 a plurality of working chambers 32 each of which successively expand and contract in volumetric size as the rotor planetates within the housing cavity. To introduce a fuel and air mixture successively into each of the working chambers 32, an intake port 34 is provided in the housing. The intake port may be located as shown in FIG. 1 in peripheral wall 20 or, as shown in FIG. 2, be located in one of the end walls 18. An exhaust port 36 is provided, as shown, in peripheral wall 20 to pass spent combustion products from successive working chambers 28. For ignition of the compressed fuel and air mixture in working chambers 32, an ignition means, such as a spark plug 38, is secured in the housing at a suitable location, such as in peripheral wall 20. The engine 10 is provided with a sealing grid according to this invention to substantially isolate working chambers 32 from each other.

The engine 10 operates on the four stroke Otto cycle principle in which each working chamber goes through an intake phase during which fuel and air is introduced into the working chamber, a compression phase where the fuel and air mixture is compressed, an expansion phase where the burning gases expand to drive the rotor, and the exhaust phase where the spent combustion gases are discharged.

The sealing grid of this invention comprises an apex seal assembly 40 located at each of the apex portions 26 of rotor 12, an outer seal which may comprise a plurality of gas seal strips 42 carried in each end face 28 and extending from one apex portion 26 to the next adjacent apex portion 26, and an inner seal which may comprise an oil seal ring 44 carried in each end face 28 of the rotor and disposed radially inwardly of gas seal strips 42 and substantially concentrically with eccentric portion 14.

Each of the apex seal assemblies 40 may comprise, as shown, apex seal pins 46 or may not as is shown in the U.S. Patent to Paschke, U.S. Pat. No. 3,251,541, dated May 17, 1966 and Griffith, U.S. Pat. No. 3,764,240, dated Oct. 9, 1973. Each of the apex seal assemblies 40 may be of any suitable type such as disclosed in the U.S. Patents to Jones, U.S. Pat. No. 3,400,691, dated Sept. 10, 1968; Bentele, U.S. Pat. No. 3,180,563, dated Apr. 27, 1965 and Jones, U.S. Pat. No. 3,300,124, dated Jan. 24, 1967 having single or multi-piece blade means 48 disposed within a radially extending groove in the apex portion 26 of rotor 12. A biasing means (not shown) such as a spring, may be provided to urge the blade means 48 in a direction outwardly of its groove and into engagement with peripheral surface 22.

Each of the gas seal strips 42 may be of any suitable construction and may, as shown, comprise an elongated body member of substantially rectangular shape in cross-section disposed within an arcuate groove 52 in end faces 28 and biased by suitable means such as a spring 53 (See FIGS. 3, 4 and 5), in a direction outwardly of the groove into contact with the inner surfaces 30 of end walls 18. For example, each of the gas seal strips 42 may be of the type disclosed in the U.S. Patent to Bentele, U.S. Pat. No. 3,176,910, dated Apr. 6, 1965 and Siler, U.S. Pat. No. 3,834,845, dated May 2, 1973. The outer seal or gas seal strips 42 in each of the rotor end faces 28 function to prevent gaseous fluid from leaking from the working chambers through the interstices 55 between each rotor end face 28 and the adjacent surface 30 of end walls 18.

The oil seal ring 44 need not be of the construction shown but may also be of any suitable construction having either a single scraper edge or multiple scraper edges. Various oils seal ring constructions are disclosed in the patents to Bentele et al, U.S. Pat. No. 3,171,590, dated Mar. 2, 1965; Paschke at al, U.S. Pat. No. 3,179,331, dated Apr. 20, 1965; Jones, U.S. Pat. No. 3,180,563, dated Apr. 27, 1965; Wilmers et al, U.S. Pat. No. 3,814,556, dated June 4, 1974; Wilmers, U.S. Pat. No. 3,843,283, dated Oct. 22, 1974; and Schmadeke, U.S. Pat. No. 3,869,230, dated Mar. 4, 1975. As best illustrated in FIG. 3, each of the oil seal rings 44, by way of example, comprises an annular member disposed for axial slidable movement in an annular recess 54 in each of the end faces 28 of the rotor and is resiliently biased in a direction outwardly of the recess by means, such as a spring 58, located in the space 60 behind the annular member and the bottom 62 of recess 54. The annular member has a tapered outer surface which terminates in a scraper edge that engages the inner surfaces 30 of end walls 28. An annular sealing member 66, such as an O-ring, is disposed in a groove in another surface 68 of the annular member so as to contact axially extending inner wall of recess 54. The seal ring 44 functions to prevent leakage of oil used for lubrication and/or cooling of the rotor from the area or space 74 radially inward of seal ring 44 into the spaces 55 defined between each seal ring 44 and the associated gas seal strips 42, the oil then possibly moving past the gas seal strips into working chambers 32. It has been found that through contamination, sludge and the like, seal rings 44 tend to become jammed thus losing their axial mobility and hence their sealing effectiveness. To overcome this problem and insure the sealing effectiveness of seal rings 44, the improvement in the sealing grid, as hereinafter fully described, is provided in engine 10.

The improvement in the sealing grid comprises the provision of a groove or transfer recess 72 in inner surface 30 of at least one of the housing end walls 18. As shown in FIGS. 1 and 2, transfer recess 72 is relatively small in size and is only a few square millimeters in area. The transfer recess 72 is located radially outward of the enveloping curve or trace 74 (See FIG. 2) of the adjacent inner seal or seal ring 44 but on the enveloping curve or trace 76 (See FIG. 2) of the outer seal or gas seal strips 42 and in the area of exhaust port 36 so that when each of the gas seal strips 42 slides over transfer recess 72, the working chamber 32 during the exhaust phase is brought into communication with the space 55 between seal ring 44 and gas seal strips 42. The space 55 is shown schematically in FIG. 2 by cross-hatching and is defined not only by seal ring 44 and gas seal strips 42 but by the end wall inner surface 30 and the adjacent rotor end face 28. As best shown in FIG. 3, during communication of working chamber 32 with space 55 via transfer recess 72, spent pressurized combustion gases pass into space 55 and thence into the space 60 behind seal ring 44 as is indicated by the arrows. The combustion gas in space 60 urges seal ring 44 in a direction outwardly of its associated annular recess 54 and the scraper edge of the seal ring into contact with the adjacent inner surface 30 of end wall 18. Since this communication and the pressurization of space 60 is intermittent, seal ring 44 is subjected to pulsations which help to maintain the axial mobility of the seal ring 44.

As illustrated in FIG. 2, where engine 10 is provided with a side intake port 78 rather than the peripheral intake port 34 of FIG. 1, transfer recess 72 is so located that communication between working chamber 32 and space 55, when gas seal strips 42 straddle transfer recess 72, only occurs when gas seal strips do not straddle side intake port 78. Thus, carryover of spent combustion gas and the resultant contamination of the fuel-air mixture in working chambers 32 during the intake phase does not occur.

Since in most seal ring 44 constructions the seal ring fits within its associated annular recess 54 within very close tolerances so that spent combustion gas can not readily enter space 60 behind the seal ring, the present invention contemplates and illustrates in FIGS. 3, 4 and 5, various alternative embodiments for facilitating the passage of gas from space 55 to space 60.

In FIG. 3 the outer axially extending wall of annular recess 54, is provided with a plurality of grooves 82 which permit relatively free flow of gas from space 55 to space 60. The grooves 82 may also serve, during the disassembly of seal ring 44, to facilitate the withdrawal of the seal ring from its associated recess 54.

In FIG. 4, a hole 84 extending from the end face 28 of the rotor to the rear or bottom portion of wall 80 of annular recess 54, is provided to communicate space 55 with space 60 behind seal ring 44 to provide, as in the embodiment of FIG. 3, rapid equalization of gas pressure in the spaces 55 and 60.

In FIG. 5, the outer rim of seal ring 44 is provided with axially extending grooves 86 which perform the same gas conducting function as grooves 82 in the embodiment of FIG. 3.

In the event engine 10 is not provided with axially extending gas pressure equalization passageways such as disclosed in the U.S. Patent to Bentele, U.S. Pat. No. 2,979,042, dated Apr. 11, 1961, transfer recesses 72 are provided in each of the surfaces 30 of housing end walls 18.

It is now believed readily apparent that the present invention provides an improved sealing grid for a rotary internal combustion engine which functions to insure sealing effectiveness of the inner seals by intermittent gas pressurization without sacrifice of engine operating efficiency and fuel economy.

Although several embodiments of the invention have been illustrated and described in detail, it is to be expressly understood that the invention is not limited thereto. Various changes can be made in the arrangement of parts, as for example, disposition of the oil seal ring (inner seals) in the end walls of the housing rather than in the rotor, without departure from the spirit and scope of the invention as the same will now be understood by those skilled in the art.

We claim:

1. An improved sealing grid for a rotary internal combustion engine having a housing with axially-spaced end walls and a peripheral trochoidal-shaped wall interconnecting the end walls to form a multi-lobed cavity therebetween and a rotor mounted within said cavity for rotation on an axis eccentric to the housing cavity, the rotor having opposite end faces adjacent the housing end walls and a peripheral surface consisting of a plurality of circumferentially-spaced apex portions forming with the housing walls a plurality of working chambers each of which successively expand and contract in volumetric size as the rotor planetates within the housing cavity as each such working chamber passes through intake, compression, expansion and exhaust phases of operation, the housing including an exhaust port therein to conduct exhaust gases from the working chambers during the exhaust phase of operation; the seal grid has an apex seal assembly at each apex portion of the rotor, outer seals and radially-spaced inner seals each of which are resiliently biased in an axial direction for sealing the interstices between the rotor end faces and the housing end walls, the improvement comprising:

a. at least one by-pass recess disposed in the end wall of the housing in the area to intermittently straddle the trace of the outer seal and adjacent the exhaust port to thereby intermittently and directly communicate a working chamber in the exhaust phase of operation with the space between the inner and outer seals to pass combustion gas to said space;

b. an annular recess is said end face of the rotor to receive said inner seal therein in close spaced relation to the bottom of the annular recess; and c. passage means to communicate the space between the inner and outer seals with said space between the bottom of the annular recess and the inner seal to conduct combustion gas to the latter space and thereby apply a gas pressure force on the inner seal in a direction outwardly of the annular recess.

2. The apparatus of claim 1 wherein said passage means is a plurality of circumferentially spaced grooves in the axially extending outer wall of said annular recess.

3. The apparatus of claim 1 wherein said passage means is a plurality of circumferentially spaced grooves in the outer surface of said inner seal.

4. The apparatus of claim 1 wherein said passage means is at least one hole in the rotor.

* * * * *